United States Patent
Hoppen et al.

(10) Patent No.: US 9,823,023 B2
(45) Date of Patent: Nov. 21, 2017

(54) HEAT EXCHANGER UNIT WITH REMOVABLE CASSETTES FOR AIR CONDITIONING IN MOTOR VEHICLES

(75) Inventors: Juergen Hoppen, Cologne (DE); Raymond Ambs, Wegberg (DE); Christian Rebinger, Ingolstadt (DE); Dirk Schroeder, Manching (DE)

(73) Assignee: HANON SYSTEMS, Daejeon-si (KR)

( * ) Notice: Subject to any disclaimer, the term of this patent is extended or adjusted under 35 U.S.C. 154(b) by 439 days.

(21) Appl. No.: 13/534,123

(22) Filed: Jun. 27, 2012

(65) Prior Publication Data

US 2012/0325433 A1    Dec. 27, 2012

(30) Foreign Application Priority Data

Jun. 27, 2011 (DE) .................. 10 2011 051 349

(51) Int. Cl.
*F28F 9/00* (2006.01)
*F28D 1/04* (2006.01)
*B60H 1/00* (2006.01)

(52) U.S. Cl.
CPC ....... *F28D 1/0435* (2013.01); *B60H 1/00328* (2013.01); *B60H 1/00542* (2013.01); *F28F 2280/02* (2013.01)

(58) Field of Classification Search
CPC ............ F25B 39/04; B60H 2001/2287; B60H 2001/0078; B60H 2001/00107; B60H 2001/00121; B60H 1/00542; F28F 2280/02; F28D 1/0435
USPC .......................... 62/303; 165/42, 43, 78, 137
See application file for complete search history.

(56) References Cited

U.S. PATENT DOCUMENTS

| | | | | |
|---|---|---|---|---|
| 4,091,262 A * | 5/1978 | Andersson et al. | ......... | 392/437 |
| 4,737,616 A * | 4/1988 | Wen-Ying | ............ | F24H 3/0417 |
| | | | | 219/472 |
| 4,774,631 A * | 9/1988 | Okuyama et al. | ............ | 361/695 |
| 5,513,296 A * | 4/1996 | Goldstein | ............ | F24H 3/0417 |
| | | | | 392/365 |
| 6,029,739 A * | 2/2000 | Izawa et al. | .................... | 165/42 |
| 6,124,570 A * | 9/2000 | Ebner et al. | .................. | 219/202 |

(Continued)

FOREIGN PATENT DOCUMENTS

| CN | 101277864 A | 10/2008 |
|---|---|---|
| DE | 10042654 A1 | 3/2002 |

(Continued)

OTHER PUBLICATIONS

DE102005039091 machine translation.*

*Primary Examiner* — Len Tran
*Assistant Examiner* — Gordon Jones
(74) *Attorney, Agent, or Firm* — Shumaker, Loop & Kendrick, LLP; James D. Miller (57) ABSTRACT

A heat exchanger unit that enables a quick interchanging of function, form and size of the different heat exchanger modules. The interchanging may be possible in regard to the sequence of the individual heat exchanger modules. The heat exchanger unit in includes inserts configured such that appropriately configured cassettes can be inserted, and an inner shape of the cassettes is configured so that different heat exchanger modules can be accommodated therein. The cassettes are thus designed specific to the heat exchanger, while the outer shape of all cassettes conforms to the shape of the uniformly configured inserts.

8 Claims, 8 Drawing Sheets

(56) References Cited

U.S. PATENT DOCUMENTS

| | | | |
|---|---|---|---|
| 6,285,004 B1 * | 9/2001 | Arold | B60H 1/0005 165/41 |
| 2003/0145978 A1 * | 8/2003 | Tsurushima et al. | 165/11.1 |
| 2004/0256082 A1 | 12/2004 | Bracciano | |
| 2006/0060343 A1 * | 3/2006 | Litwing et al. | 165/204 |
| 2007/0256433 A1 * | 11/2007 | Bhatti | F24F 5/0035 62/121 |
| 2007/0271953 A1 * | 11/2007 | Koukouravas et al. | 62/404 |

FOREIGN PATENT DOCUMENTS

| | | | | |
|---|---|---|---|---|
| DE | 102005029774 A1 | 3/2006 | | |
| DE | 102004051874 B3 | 5/2006 | | |
| DE | 102005039091 A1 * | 2/2007 | | F28D 1/0435 |
| DE | 102007027798 A1 | 12/2008 | | |
| JP | 2002002256 A | 1/2002 | | |
| JP | 2002219929 A | 8/2002 | | |

\* cited by examiner

HEAT EXCHANGER UNIT WITH REMOVABLE CASSETTES FOR AIR CONDITIONING IN MOTOR VEHICLES

CROSS-REFERENCE TO RELATED APPLICATION

This application claims the benefit of German Patent Application No. DE 10 2011 051 349.3 filed Jun. 27, 2011, the entire disclosure of which is hereby incorporated herein by reference.

FIELD OF THE INVENTION

The invention concerns a heat exchanger unit with heat exchanger modules that can be inserted therein, such as is used especially in air conditioning of motor vehicles. With the invention, individual heat exchangers can be integrated as needed into the heat exchanger unit as modules, while the heat exchanger modules can be changed in sequence and replaced with each other. All types of heat exchangers suitable for air conditioning can be used. In particular, glycol heating heat exchangers and electrical heating elements such as positive temperature coefficient (PTC) heating elements and high-volt PTC, can be used as the heat exchangers or heat exchanger modules, as can heat pump condensers, heat pump evaporators, or electrical cooling elements.

BACKGROUND OF THE INVENTION

Air conditioning appliances with several interchangeable heat exchangers are known in various configurations in the prior art.

Heating and air conditioning units for vehicles with internal combustion engines generally have a glycol heating heat exchanger and optionally an auxiliary electrical heater, such as a positive temperature coefficient (PTC) heating element. These two heating elements have a predetermined size and arrangement. The auxiliary electrical heater (PTC) is situated in the air flow direction behind the glycol heating heat exchanger.

A heating and air conditioning system for a vehicle is known from U.S. Pat. Appl. Pub. No. 2004/0256082, with compressor, condenser, fan and expansion valve modules arranged on a frame.

In DE 10 2004 051 874 B3, a modular system is described for building an air treatment system (air conditioner) for vehicles. An expansion module designed as a shove-in drawer is provided in the housing, and the expansion module can be outfitted with different functional elements and thus, the outfitting with functional elements can be quickly changed with the interchangeable expansion modules. But here, the complete expansion modules have to be interchanged in order to realize a new configuration of the functional elements. For a quick interchange, the different functional elements cannot be used in both shove-in drawers.

DE 10 2007 027 798 A1 proposes coupling the air conditioning unit of a motor vehicle to at least one temperature control module by a coupling module. No further information is provided as to the structural form of the coupling module or its arrangement.

Air conditioners with a fixed size and arrangement of the heating elements cannot be used for different vehicle types such as internal combustion engine, hybrid drive, or electric drive. For vehicles with hybrid or fully electric drive, new heating or auxiliary heating techniques and thus, novel heating elements are needed. These novel heating elements are generally not compatible in size and arrangement with the classical heating elements for vehicles with internal combustion engines. Therefore, different air conditioning housing types are needed.

U.S. Pat. Appl. Pub. No. 200410256082 A1 deals solely with vehicles with an electric air conditioning system for hybrid or fuel cell automobiles. The described module also contains, besides the heater/air conditioner, the entire refrigerant circuit. The structural form of the heater/air conditioner itself is not described.

DE 10 2004 051 874 B3 describes a plug-in expansion module that can be outfitted with different functional elements. The expansion module corresponds to a single large cassette that can be shoved into the housing opening that is provided. Each variant of the heater/air conditioner with a different sequence of heat exchangers or different configurations of heat exchangers would thus require a specially adapted variant of this large and thus costly cassette.

DE 10 2005 029 774 A1 describes a motor vehicle air conditioning unit with a multipiece air conduit housing and components arranged therein such as at least a heater, wherein the air conduit housing is fashioned as a plug-in part in the area of at least one of the components.

A very generally described temperature control module is known from DE 10 2007 027 798 A1, which when not in use by the driver of the vehicle is easily taken out, so as to save on weight and thus energy. Nothing is said about the structural form.

The problem of the invention is to create a heat exchanger unit that enables a simple and economical interchanging of function, form, and size of the different heat exchanger modules. The interchanging should be possible in regard to the sequence of the individual heat exchanger modules. Likewise, it should also be possible to easily replace heat exchanger modules by other ones. The heat exchanger unit should be space saving and economical. The heat exchanger modules should be compatible between different heat exchanger units according to the invention.

SUMMARY OF THE INVENTION

Consistent and consonant with the present invention, a heat exchanger unit that enables a simple and economical interchanging of function, form and size of the different heat exchanger modules, has surprisingly been discovered.

The problem is solved by the features in claim 1. Modifications are given in the dependent claims.

The invention is realized by a heat exchanger unit that is made from a housing with inserts, the inserts being configured in the housing such that cassettes configured to match up with the inserts can be inserted, and the inner shape of the cassettes is configured so that different heat exchanger modules can be accommodated therein.

The cassettes are designed specific to the heat exchanger or can be adapted to different heat exchangers, while the outer form of all cassettes conforms to the shape of the uniformly configured inserts. The inserts are recesses and guideways in the housing of the heat exchanger unit that are adapted to receive the cassettes.

Hence, thanks to the heat exchanger unit integrated in the air conditioning system, it is possible to replace the equipment needed for the particular vehicle variant and thus make variable use of the heat exchangers in the required sequence in the airflow direction. Thanks to standardization, the cassettes are interchangeable and therefore can also be used for other appropriately designed heat exchanger units, i.e., other air conditioning, ventilation, or heating devices.

In advantageous configurations, the heat exchanger modules are designed as heat pump condensers, heat pump evaporators, heating heat exchangers, or as electrical heating or cooling elements. Essentially, one can use all types of heat exchangers for the control of air temperature, such as glycol heating heat exchangers, auxiliary electric heaters, such as PTC heating elements, full electric heaters, like so-called high-volt PTC, or electric cooling elements.

Thanks to the different heat exchanger modules, one can realize different heat exchange concepts with a single heat exchanger unit.

According to the conception of the invention, the different heat exchanger modules such as heat pump condensers, heat pump evaporators, heating heat exchangers, or electrical heating or cooling elements are arranged in the housing interchangeably in their sequence in the air flow direction. The interchangeability of the sequence is made possible by the uniform outer shape of the cassettes. In this way, depending on the vehicle propulsion, climate zone, vehicle configuration and other operating conditions, the heat exchangers can be optimally configured. Even adaptations to seasonally fluctuating different capacities can be handled by interchangeable heat exchangers. This ensures that each vehicle type can be optimally outfitted without needing different air conditioning housing variants for this. A further benefit is that the individual heat exchangers are used optimally and in this way the overall efficiency can be maximized.

According to one embodiment of the invention, the cassette is configured specific to the heat exchanger, that is, the inner seat of the cassette for the heat exchanger or exchangers is adapted to the latter.

Alternatively, the cassette can be adapted to different heat exchangers by suitable adapter elements and is thus, universally usable, According to another embodiment, the inserts are configured as an insert by rastering, such that cassettes of varying height can be inserted in a different sequence. In this way, one can use in the heat exchanger units heat exchanger cassettes that are adapted in height to the different heat exchanger modules with a raster gradation corresponding to the rastering of the insert. In this way, heat exchanger modules of different height can be integrated with space savings and interchangeably in the heat exchanger units.

According to a modification, the cassettes are streamlined. This can be easily accomplished by appropriate adapting of the cassettes to the cross section of the particular heat exchanger, avoiding any edges. Optimal is a beveling, optionally with vaulting, in the oncoming flow and trailing flow regions of the cassettes. By adapting to the size of the particular heat exchangers, these can be placed in an optimal flow. The streamlining reduces the flow noise and decreases the energy input of the fan. The adapting can also be done by adapter elements to hold the heat exchangers in the cassettes, wherein a dual function of the adapter elements occurs, to fit the heat exchangers into the cassette and to streamline the position of the heat exchanger in the heat exchanger unit.

According to another modification, the cross section of the housing of the heat exchanger unit is dictated by the size of the largest heat exchanger. This also gives the size of the cassette. All heat exchangers smaller in cross section can be adapted appropriately by the configuration and size of the inner shape of the cassette to the size of the inserts.

According to one embodiment of the invention, the housing is part of an air conditioner of a motor vehicle. The combining of the heat exchanger unit with the air conditioner achieves a compact and thus, especially space-saving design, which is especially suitable for use in motor vehicles.

According to one aspect of the invention, a cassette is provided that can be inserted into the inserts arranged in the housing of a heat exchanger unit, while the outer shape of the cassette corresponds to the inserts and the inner shape of the cassette is configured so that it corresponds each time to the outer shape of a heat exchanger that can be inserted in it. The cassette functions as an adapter, enabling an adapting of specific heat exchangers to uniformly configured inserts of a heat exchanger unit. In this way, heat exchanger units with high flexibility can be assembled from different heat exchangers.

Thus, the concept of the invention consists in that heat exchanger modules are placed in cassettes. The inner shape of the cassettes is designed each time according to the outer shape of the heat exchanger modules. All cassettes are configured so that they correspond in outer shape to the housing inserts and thus, different heat exchanger modules can be placed in the housing inserts. If a heat exchanger due to its size and the presence of adjacent cassettes cannot be accommodated directly in the housing insert with appropriate sealing, a cassette need not be used for it.

Thanks to the cassettes, it is advantageously possible for heat exchanger modules of different outer shape to be given a uniform outer shape and thereby be easily interchangeable in the heat exchanger unit. Thanks to the uniform outer shape of the heat exchanger modules realized with the cassettes, these can be used interchangeably in the housing inserts.

In this way, the heat exchanger unit can be adapted optimally to different vehicle types and area of application, without this requiring different housing types for the heater/air conditioner. The interchanging or changing of the sequence of the heat exchanger modules is thus also possible regardless of their size.

BRIEF DESCRIPTION OF THE DRAWINGS

Further details, features and advantages of embodiments of the invention will emerge from the following description of sample embodiments making reference to the accompanying drawings. There are shown.

DETAILED DESCRIPTION OF EXEMPLARY EMBODIMENTS OF THE INVENTION

The following detailed description and appended drawings describe and illustrate various embodiments of the invention. The description and drawings serve to enable one skilled in the art to make and use the invention, and are not intended to limit the scope of the invention in any manner.

Figure 1:
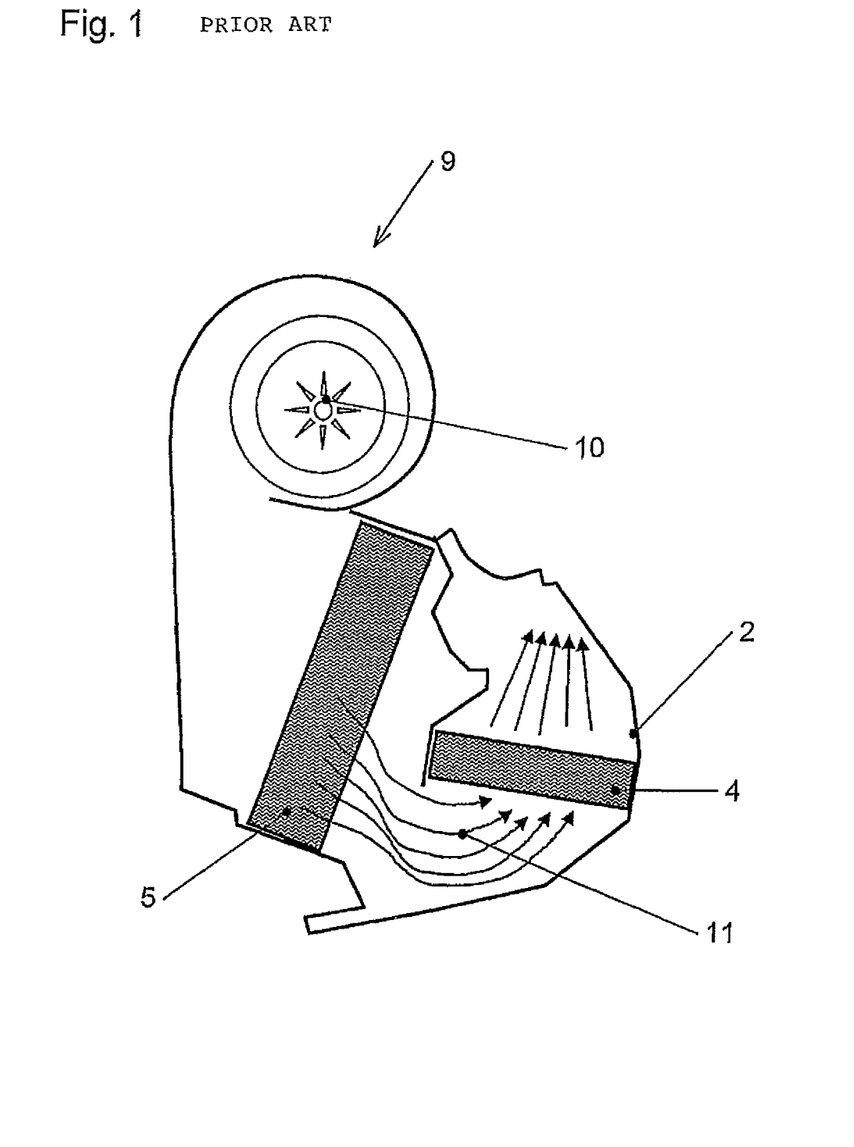
FIG. 1: air conditioner with permanently installed heat exchanger according to the prior art.

FIG. 1 shows an air conditioner 9 with a permanently installed heating heat exchanger 4 of the prior art. A fan 10 transports air flow 11 at first through an evaporator 5, where it is dehumidified and cooled down. After this, the air flows through the heating heat exchanger 4, where the air is heated to the desired temperature. Like the evaporator 5, the heat exchanger 4 is likewise permanently installed in the air channel formed by a housing 2.

Figure 2:
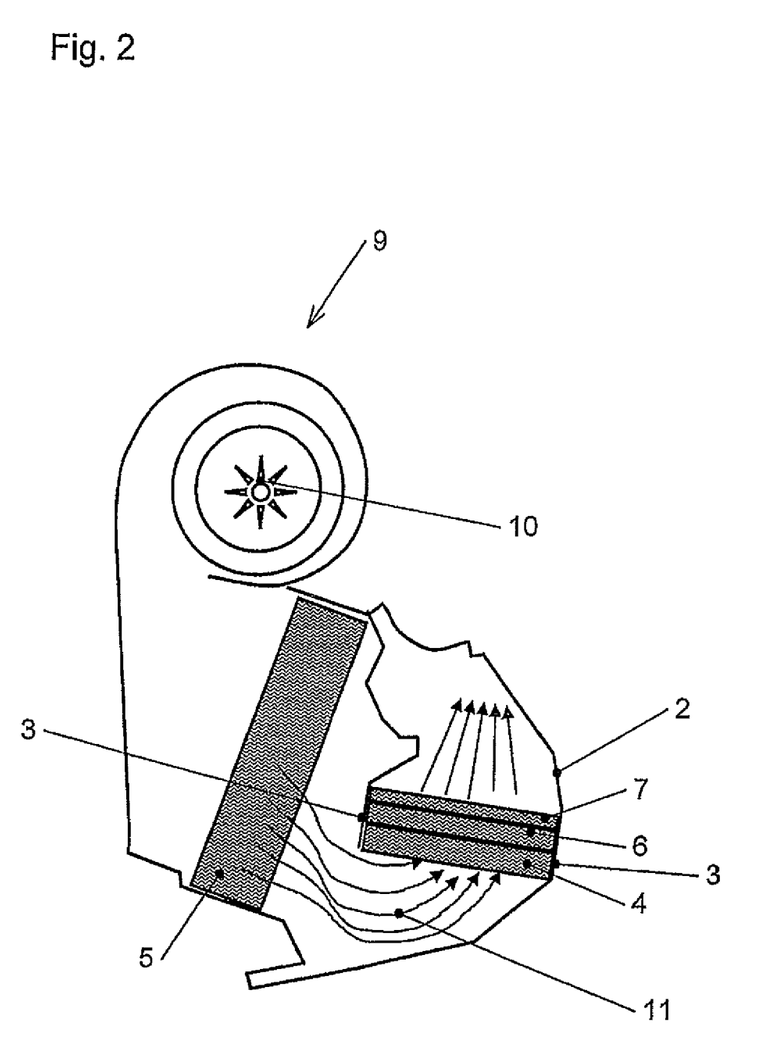
FIG. 2: air conditioner with several heat exchanger modules.

FIG. 2 shows a configuration of an air conditioner 9 according to the invention, in which several heat exchangers 4, 6, 7 are modularly arranged in inserts 3 of the housing 2. The heat exchangers 4, 6, 7 are received in cassettes 8, shown in FIGS. 3-8, which act as adapters. The replacing of the heat exchangers 4, 6, 7 is done by replacing the cassettes 8 with the heat exchangers 4, 6, 7 arranged therein. The outer shape of the cassettes 8 corresponds to the configuration of the inserts 3.

Figure 3:
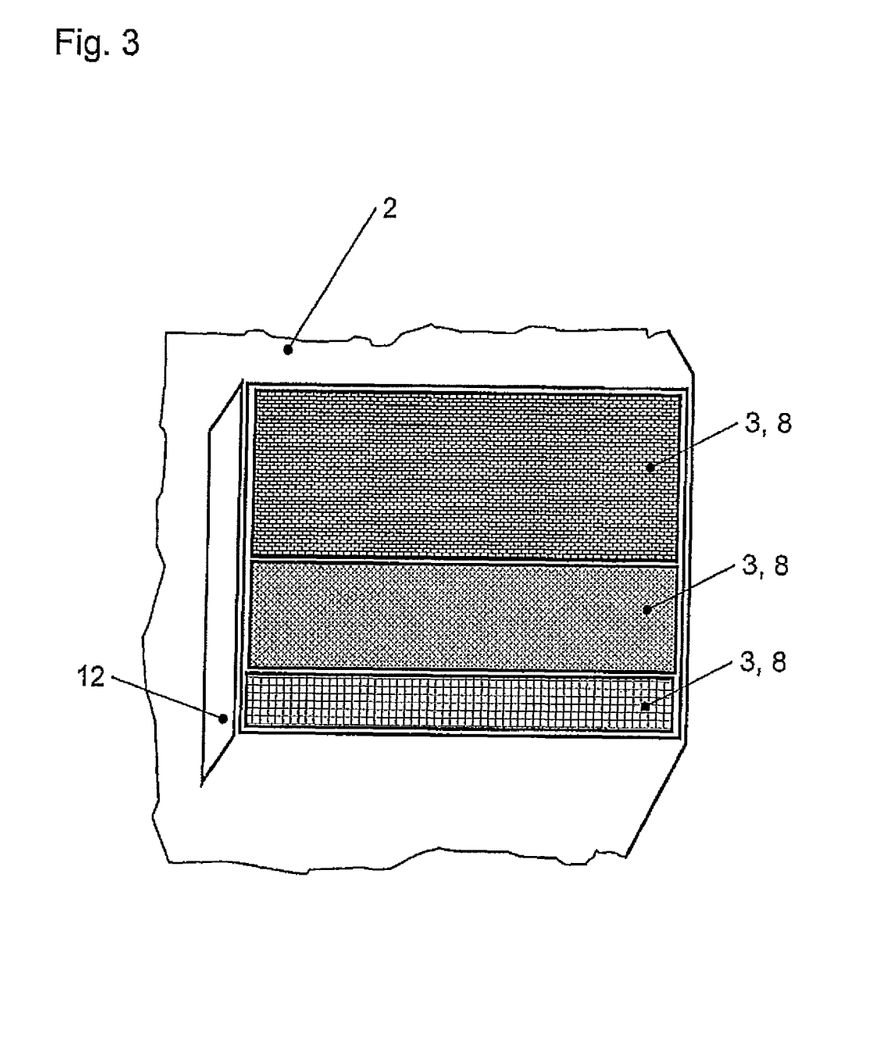
FIG. 3: detail view of the inserts with cassettes.

FIG. 3 shows the detail of the inserts 3 in the housing 2 with cassettes 8 inserted into the inserts 3. The cassettes 8 have an outer shape that is compatible with the inserts 3 in the housing 2 of the air conditioner. The cassettes 8, similar to drawers, are received in the inserts 3 of the housing 2. As the content of the drawer is independent of the inserts, different heat exchangers (not shown)—especially those with different height—can be placed in the cassettes 8. The rastering in the most elementary case can be realized by the height of the cassettes 8. The criterion is that the overall height of the inserted cassettes 8 corresponds to the overall height of the insert 3 or the inserts 3. For an overall height of the insert 3 of, say, 12 cm and a rastering of 2 cm, a cassette 8 with 6 cm, one with 2 cm and one with 4 cm can be placed in the insert 3, for example. The sequence of the cassettes 8 of different height is variable. For sealing against the housing 2, the inserts can be sealed by a cover 12, such as a door. Likewise, the cassettes 8 can be configured such that a cover is integrated in the housing 2, including the seal.

Figure 4:
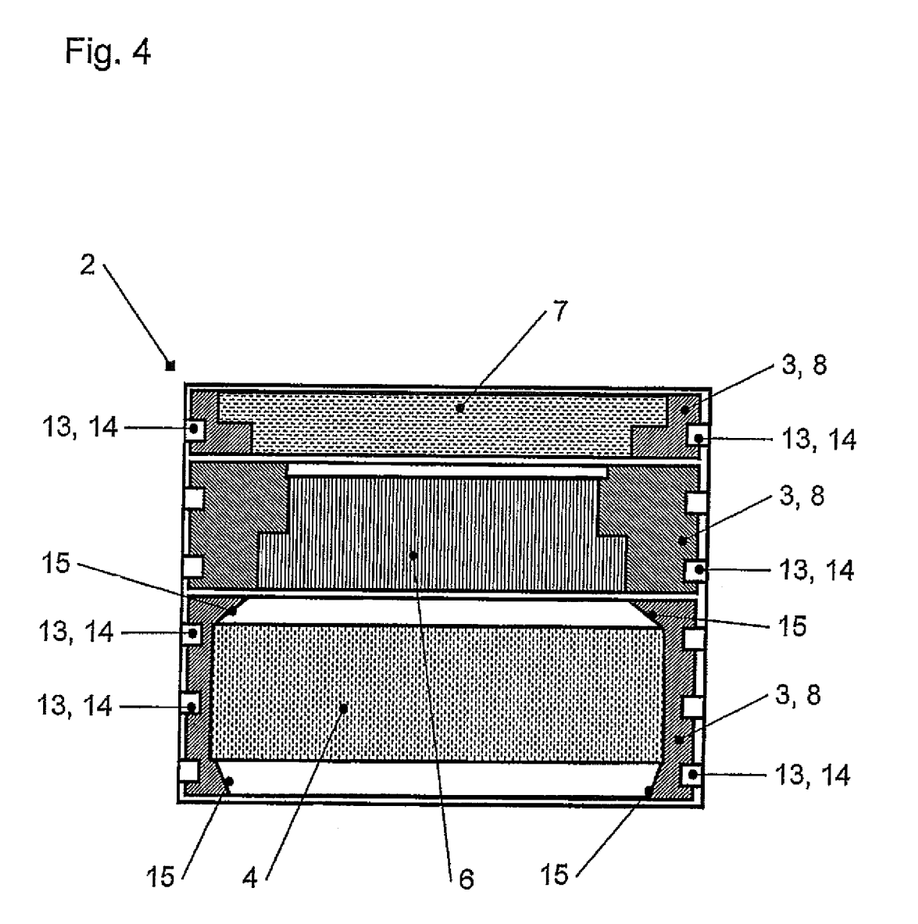
FIG. 4: sectional view of the inserts with cassettes and heat exchanger modules.

FIG. 4 shows the detail of the inserts 3 in the housing 2 with the heat exchangers 4, 6, 7 and the cassettes 8 in cross section.

The heat exchanger modules 4, 6, 7 here are, for example, a heat pump condenser 4, a heating heat exchanger 6, and an electrical heating or cooling element 7.

For this, the inner shape of the cassettes 8 is configured according to the outer shape of the heat exchangers 4, 6, 7. The inner shape of the cassettes 8 corresponds to the outer shape of the heat exchanger modules 4, 6, 7. In this way, a close-fitted and tight insertion of the different heat exchangers 4, 6, 7 in the housing 2 can be realized. In addition, sealing elements such as sealing lips (not shown) are arranged appropriately between the different cassettes 8, between the cassettes 8 and the inserts 3, in the housing 2, and on the heat exchanger modules 4, 6, 7.

One should strive for a standardization of the heat exchanger modules 4, 6, 7, so that the cassettes 8 can be used each time for several of the heat exchanger modules 4, 6, 7 of similar size.

The heat exchanger modules 4, 6, 7 can be introduced, for example, by inserting them in or placing them in the cassettes 8. Likewise, the cassettes 8 can be in two or more pieces (not shown), such that a top part and a bottom part of the cassettes 8 can be connected by clips, or screws, thus receiving and holding the heat exchanger modules 4, 6, 7.

Since the heat exchangers 4, 6, 7 can have different heights, the associated cassettes 8 are designed according to the height of the particular heat exchangers 4, 6, 7. The inserts 2 are configured so as to have a raster dimension that corresponds to the height graduation of the cassettes 8. In this way, it is possible to arrange the cassettes 8 and thus the heat exchangers 4, 6, 7 in the housing 2 regardless of their height.

For example, if only one heat exchanger 4, 6, 7 with 8 cm height is required, a cassette 8 with 4 cm height without heat exchanger can be inserted. By the removal of unneeded heat exchangers, flow noises, pressure loss, and the resulting power uptake of the fan can be reduced.

A rastering of the inserts 3 can be realized, for example, by guide rails 13 at corresponding distance in the inserts 3. Accordingly, corresponding guide grooves 14 are arranged in the cassettes 8.

The rastering of the inserts 3 makes it possible to change the sequence of heat exchangers 4, 6, 7.

The cassettes 8 are advantageously configured such that the airflow is optimized. This can be accomplished, for example, by appropriately arranged leading-edge bevels 15. This enables an optimal heat transfer while at the same time reducing the flow noises and the power uptake of the fan (not shown). The inner shape of the cassettes 8 is configured such that corresponding connection elements such as pipelines or cables can be integrated in it. The connection lines of the respective heat exchanger modules 4, 6, 7 are laid out at the factory. The cable laying can be simplified by plug connections and that of media lines by screw connections.

Figure 5:
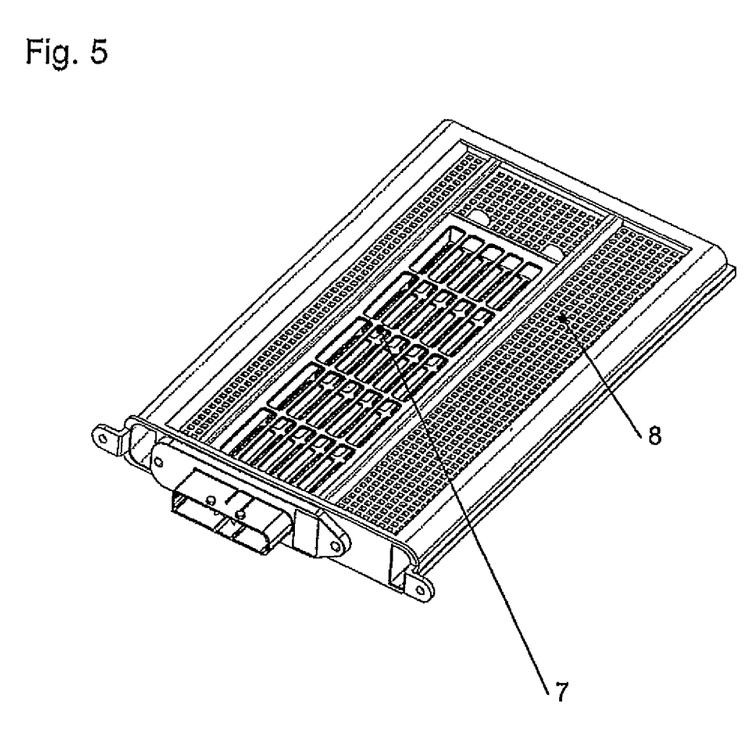
FIG. 5: cassette with PTC.

FIG. 5 shows a cassette with PTC heating element 7. One notices here that the PTC heating element 7 which is considerably smaller in terms of flow cross section of the heat exchanger unit (not shown) is adapted to the size of the insert (not shown) by the cassette 8.

Figure 6:
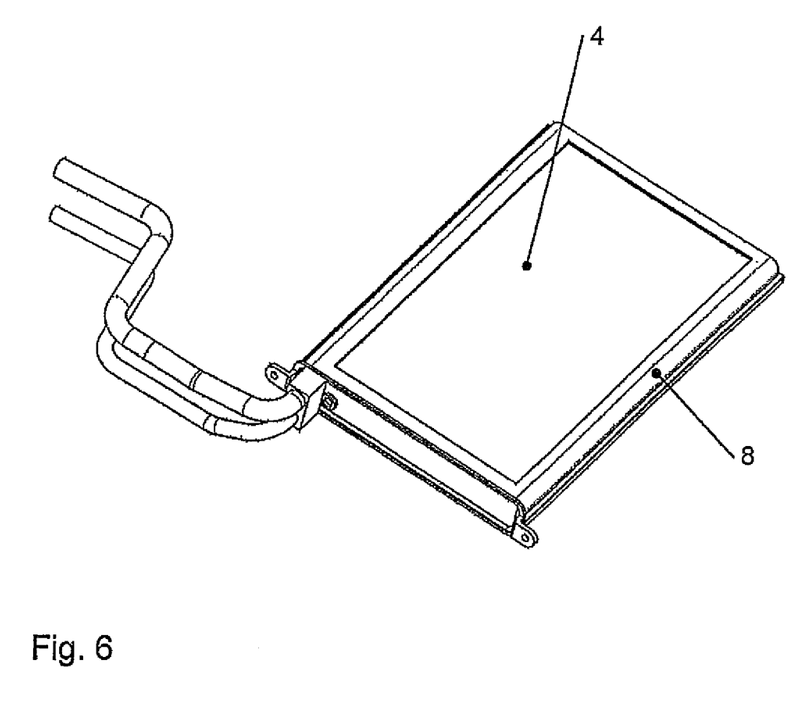
FIG. 6: cassette with condenser.

FIG. 6 shows the cassette 8 with the condenser 4. The condenser 4 here has a size that corresponds almost to that of the cassette 8. The cassette 8 here only has the task of functioning as an adapter for the shape of the inserts (not shown).

Figure 7:
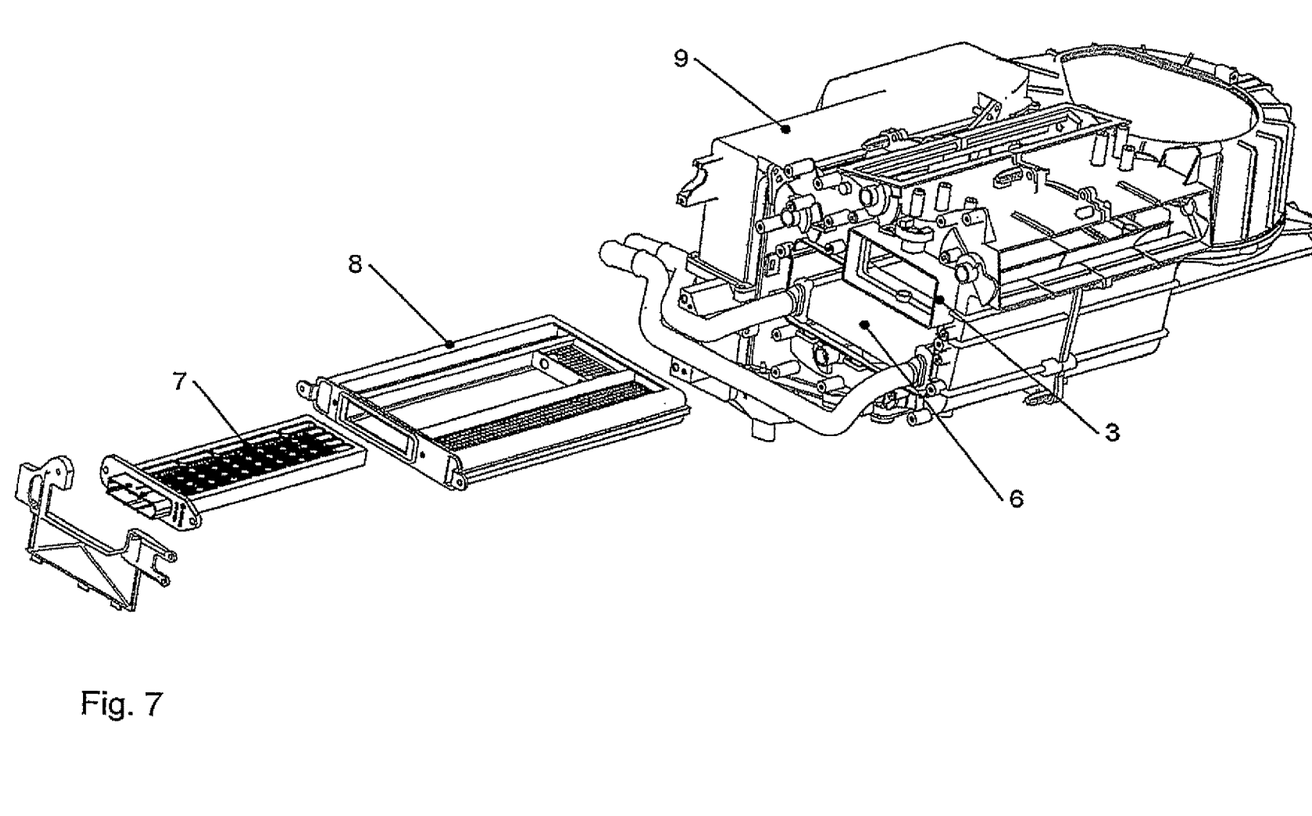
FIG. 7: installation diagram for an air conditioner with cassette for PTC auxiliary heater.
Figure 8:
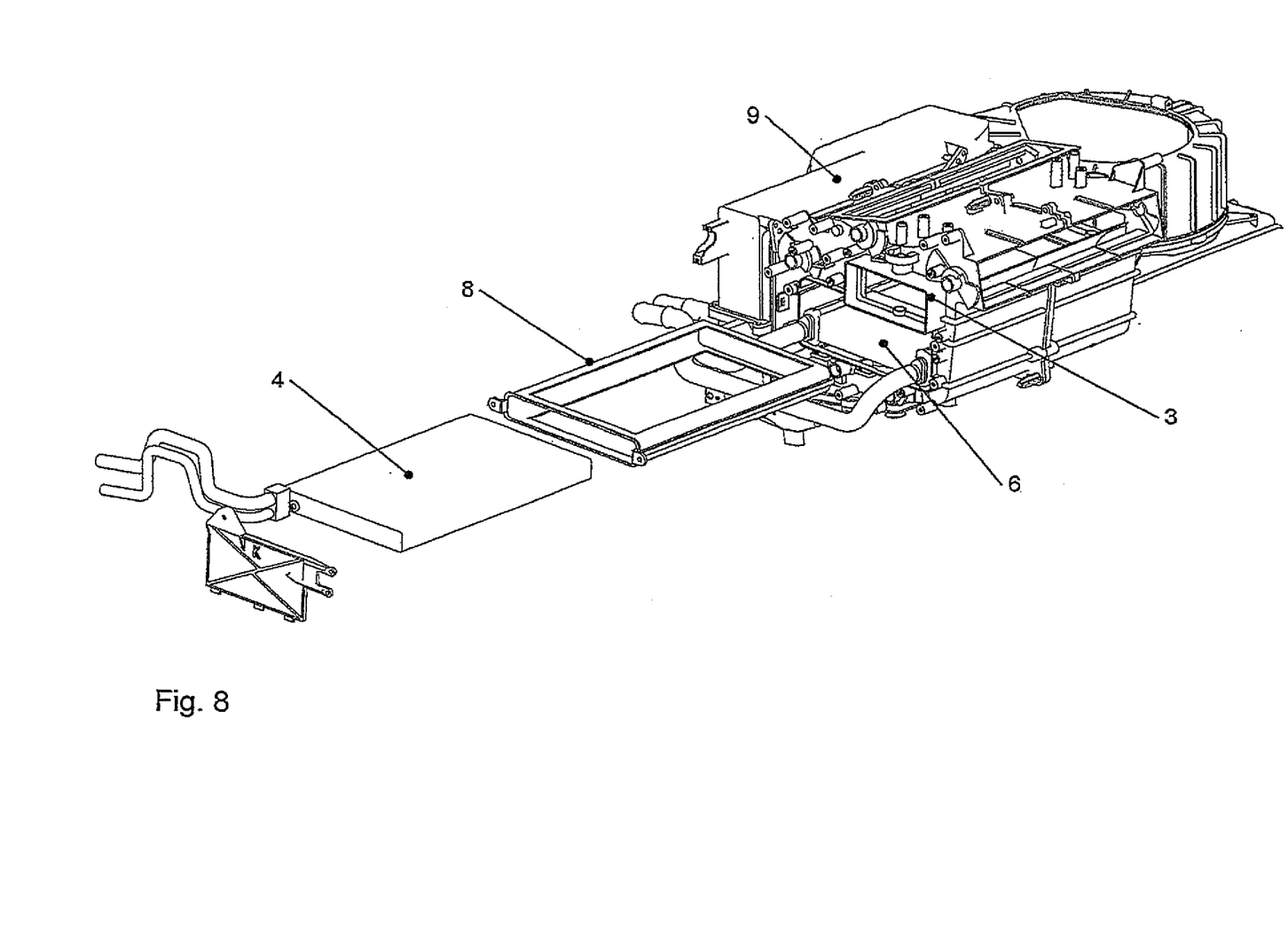
FIG. 8: installation diagram for an air conditioner with cassette for a condenser.

FIG. 7 and FIG. 8 show installation options for an air conditioner 9 with the cassette 8 for the PTC auxiliary heater 7, or the condenser 4. The exploded diagrams illustrate that the outer shape of the cassettes 8 is configured each time so that they are interchangeable with each other in the insert 3 of the housing of the air conditioner 9. The inner shape of the cassettes 8 is configured so that it corresponds to the outer shape of the heat exchanger the PTC auxiliary heater 7 or the condenser 4. Thus, the heat exchangers 4, 7 are interchangeable with each other.

The glycol heating heat exchanger 6 here is permanently installed in the air conditioner 9. It is also possible for the heat exchangers 4, 6, 7 to be configured already so that the outer shape corresponds to the inserts 3 of the housing of the air conditioner 9. The cassette 8 is de facto integrated in these specially fabricated heat exchangers 4, 6, 7. Thus, these heat exchangers 4, 6, 7 can also be interchanged, like the ones integrated in the cassettes 8.

The condenser 4 in FIG. 8 is arranged upstream from the glycol heating heat exchanger 6. However, the sequence can also easily be reversed.

Thanks to the arrangement and number of the inserts 3, the heat exchangers 4, 6, 7 can be changed in their sequence and thus, for example, be positioned upstream or downstream from permanently installed heat exchangers.

From the foregoing description, one ordinarily skilled in the art can easily ascertain the essential characteristics of this invention and, without departing from the spirit and scope thereof, make various changes and modifications to the invention to adapt it to various usages and conditions.

LIST OF REFERENCE SYMBOLS 1 heat exchanger unit
2 housing
3 inserts
4 heat exchanger, heat pump condenser, heating heat exchanger
5 heat exchanger, heat pump evaporator
6 heat exchanger, heating heat exchanger
7 heat exchanger, electrical heating or cooling element, PTC heating element
8 cassette
9—air conditioner
10 fan
11 airflow
12 cover
13—guide rail
14 guide groove
15 leading-edge bevel

What is claimed is:

1. A heat exchanger unit for an air conditioner in a motor vehicle, the heat exchanger unit comprising:
    a housing;
    a plurality of inserts formed in the housing, the plurality of inserts arranged in series in a direction of a flow of air; and
    a plurality of cassettes configured to receive a plurality of heat exchanger modules therein, each of the plurality of cassettes configured to be received in one of the plurality of inserts, wherein an outer shape of the plurality of cassettes corresponds to a shape of the plurality of inserts and an inner shape of the plurality of cassettes corresponds to an outer shape of the plurality of heat exchanger modules, wherein each of the plurality of cassettes has the same external dimension so the plurality of cassettes are interchangeable in position in the housing, wherein a first one of the plurality of cassettes includes a bevel portion formed between a first heat exchanger module of the plurality of heat exchanger modules and a second heat exchanger module of the plurality of heat exchanger modules.

2. The heat exchanger unit according to claim 1, wherein each of the plurality of heat exchanger modules is one of a heat pump condenser, a heat pump evaporator, a heating heat exchanger, an electrical heating element, and an electrical cooling element.

3. The heat exchanger unit according to claim 1, wherein the housing is part of an air conditioner.

4. The heat exchanger unit according to claim 1, wherein each of the plurality of cassettes is a unitary structure.

5. The heat exchanger unit according to claim 1, wherein each of the plurality of cassettes is formed from a plurality of pieces.

6. The heat exchanger unit according to claim 1, wherein the plurality of inserts include guiderails for aligning the plurality of cassettes.

7. The heat exchanger unit according to claim 6, wherein the plurality of cassettes include a groove formed therein configured to receive the guiderails.

8. The heat exchanger unit according to claim 1, wherein an inner shape of the plurality of cassettes correspond to an outer shape of the plurality of heat exchanger modules.

* * * * *